US005705207A

United States Patent [19]
Cook et al.

[11] Patent Number: 5,705,207
[45] Date of Patent: Jan. 6, 1998

[54] METHOD OF MAKING GLUTEN COLLOIDAL DISPERSIONS AND EDIBLE COATINGS THEREFROM

[75] Inventors: Richard B. Cook, Chelmsford; Mark L. Shulman, Waltham, both of Mass.

[73] Assignee: Opta Food Ingredients, Inc., Bedford, Mass.

[21] Appl. No.: 641,287

[22] Filed: Apr. 30, 1996

Related U.S. Application Data

[63] Continuation-in-part of Ser. No. 432,988, May 2, 1995, Pat. No. 5,705,208.

[51] Int. Cl.⁶ .................................. A23J 1/12; A23J 3/34
[52] U.S. Cl. .................................. 426/89; 426/56; 426/93; 426/626; 426/656
[58] Field of Search ........................ 426/89, 93, 656, 426/56, 626

[56] References Cited

U.S. PATENT DOCUMENTS

| | | | |
|---|---|---|---|
| 2,311,485 | 2/1943 | Sturken | 106/153 |
| 2,377,237 | 5/1945 | James | 106/153 |
| 2,475,133 | 7/1949 | Furter et al. | 426/72 |
| 2,791,509 | 5/1957 | Cosler | 426/302 |
| 3,314,800 | 4/1967 | Noznick et al. | 99/127 |
| 3,323,922 | 6/1967 | Durst | 99/166 |
| 3,479,191 | 11/1969 | Cole | 426/303 |
| 3,615,715 | 10/1971 | Mullen | 106/150 |
| 3,653,925 | 4/1972 | Anker et al. | 426/302 |
| 3,782,964 | 1/1974 | Knight | 426/364 |
| 3,840,676 | 10/1974 | Yamamoto et al. | 426/89 |
| 3,991,218 | 11/1976 | Earle et al. | 426/250 |
| 4,066,796 | 1/1978 | McKee | 426/302 |
| 4,224,219 | 9/1980 | Van Blanton et al. | 106/149 |
| 4,293,572 | 10/1981 | Silva et al. | 426/19 |
| 4,543,370 | 9/1985 | Porter et al. | 424/440 |
| 4,820,533 | 4/1989 | Seaborne et al. | 426/76 |
| 4,876,094 | 10/1989 | Benton et al. | 426/472 |
| 4,876,097 | 10/1989 | Autant et al. | 426/656 |
| 4,942,043 | 7/1990 | Sander | 426/2 |
| 5,021,248 | 6/1991 | Stark et al. | 426/531 |
| 5,182,130 | 1/1993 | Haralampu et al. | 427/3 |
| 5,324,351 | 6/1994 | Oshlack et al. | 106/153 |

FOREIGN PATENT DOCUMENTS

| | | |
|---|---|---|
| 831943 | of 1970 | Canada. |
| 0 585 688 A3 | 3/1994 | European Pat. Off.. |
| 0 593 123 A1 | 4/1994 | European Pat. Off.. |
| 1323056 | 2/1963 | France. |
| WO80/00659 | 4/1980 | WIPO. |
| WO89/00589 | 6/1989 | WIPO. |
| WO90/03123 | 4/1990 | WIPO. |
| WO91/06227 | 5/1991 | WIPO. |
| WO93/12667 | 7/1993 | WIPO. |

OTHER PUBLICATIONS

International Search Report, PCT/US90/06441.
Gontard et al., "Edible Wheat Gluten Films: Influence of the Main Process Variables ...", *Journal of Food Science* 57(1):190–199 (1992).
Gontard et al., "Edible Composite Films of Wheat Gluten and Lipids: Water Vapour permeability ...", *Int.l Journal of Food Science and Tech.* 29:39–50 (1994).
Shogren et al., "Functional (Breadmaking) and Biochemical Properties of Wheat Flour ...", *Cereal Chemistry* 46(2):93–102 (Mar. 1969).
N. Gontard, "Edible and Biodegradable Films: Study of Wheat Gluten Film-Forming Properties", *C.R. Acad. Agric. Fr.* 80(4):109–117 (May 25, 1994).
Gontard et al., "Water and Glycerol As Plasticizers Affect Mechanical and Water Vapor ...", *Journal of Food Science* 58(1):206–211 (1993).
L. Krull & G.E. Inglett, "Industrial Uses of Gluten", *Cereal Science* 16(8):232–236,261 (Aug. 1971).
A. Gennadios and C.L. Weller, "Edible Films and Coatings from Wheat and Corn Proteins", *Food Technology* pp. 63–69 (Oct. 1990).
F. Macritchie, "Studies of the Methodology for Fractionation and Reconstitution of Wheat Flours", *Journal of Cereal Science* 3:221–230 (1985).
J.A. Bietz and J.S. Wall, "The Effect of Various Extractions on the Subunit Composition ...", American Association of Cereal Chemists, Inc., pp.145–155 (1975).
Weegles et al., "Large-Scale Separation of Gliadins and Their Bread-Making Quality", *Journal of Cereal Science* 20:253–264 (1994).
Khan et al., "Disaggregation of Glutenin with Low Concentrations of Reducing ...", *Cereal Chemistry* 71(3):242–247 (1994).
S. Okamoto, "Factors Affecting Protein Film Formation", *Cereal Science Today* 23(5):256–262 (May 1978).
Gontard et al., "Edible Films and Coatings From Natural Biopolymers", Universite de Montpellier II, GBSA.

*Primary Examiner*—Helen Pratt
*Attorney, Agent, or Firm*—Hamilton,Brook,Smith & Reynolds, P.C.

[57] ABSTRACT

Film forming colloidal dispersions containing gluten or gluten-derived proteins and their methods of manufacture are described. The colloidal dispersion can be coated onto a variety of substrates to provide resistance to moisture, lipid and gas permeation, as well as provide a glossy sheen to the substrate. The colloidal dispersions can function as an adhesive for adhering particles onto the substrate. Foods coated with the colloidal dispersion are also described.

35 Claims, No Drawings

METHOD OF MAKING GLUTEN COLLOIDAL DISPERSIONS AND EDIBLE COATINGS THEREFROM

RELATED APPLICATION

This is a continuation-in-part application of U.S. patent application Ser. No. 08/432,988, filed May 2, 1995 now U.S. Pat. No. 5,705,208. The entire teachings of the application are incorporated herein by reference.

BACKGROUND

Many efforts have been made to optimize water resistance, water vapor permeability and mechanical properties of edible coatings while increasing their clarity and gloss. Edible coatings from prolamines have been used to produce films, however, due to their solubility in aqueous alcohol mixtures, or in aqueous mixtures of extreme pH (less than pH 2 or greater than pH 10), most of the applications of prolamine films are from solutions of prolamines in alcohol and other solvent mixtures or water-based solutions having extreme pH's. Heat must be applied to evaporate the ethanol or else there is a substantial loss of gloss and white artifacts appear on the film. Due to these disadvantages of prolamine coating systems in foods, there has been a reluctance by the food industry to use prolamine film systems, since these solvents and/or pH levels are often incompatible with and difficult to remove from the food. Also, the use of organic solvents poses safety issues with the emission of vapors during the curing of the films, with the fire hazard that they pose, and with the possible residuals they may leave in the food.

In food applications, several protein films such as gelatin, casein and zein, have been shown to have good water and/or lipid barrier properties. For example, zein provides a glossy surface possessing both good lipid and moisture barrier protection. The use of zein has been limited to the nut and confection industry, however, due to the need for organic solvents and/or extreme pH's. Gluten has also been used for coatings but requires the presence of plasticizers and lipids to yield a coating with useful mechanical and water-barrier properties. These gluten-based films however still have inferior water barrier properties and do not provide gloss.

SUMMARY OF THE INVENTION

The present invention relates to methods of forming colloidal dispersions containing microparticles of gluten-derived protein which are suspended in a dilute aqueous acid medium. The colloidal dispersions can be maintained as stable, homogeneous dispersions under ambient storage conditions without microbial contamination. Alternatively, the colloidal dispersions can be dried and rehydrated prior to use. The colloidal dispersions can be coformulated with various additives, such as waxes or plasticizers, to alter the barrier properties (e.g., water/lipid resistance, vapor permeability), transparency, gloss and/or mechanical properties (e.g., flexibility) of the resultant film cast from the colloidal dispersion.

Colloidal dispersions of the present invention, when cast onto a substrate, form a glossy coating when dried at ambient temperature. For many food applications, the use of ambient temperature for curing the film is a significant advantage and avoids problems of product degradation if elevated temperature were used and the appearance of white artifacts within the film when ethanolic zein solutions are used. The films can further serve as an adhesive for adhering particulate material (e.g., seeds, salts, spices, confections, fruit) onto the substrate. Suitable substrates include but are not limited to confections, raw, cooked and dehydrated meats, dessert items, snack foods (e.g., pretzels, chips, tortillas), cheese (e.g., low fat cheese), fried foods (e.g., french fries), candies (e.g., chocolates), fruit (e.g., raisins), vegetables, cereals, baked goods, seeds, nuts, beans (e.g., coffee), vitamins and tablets.

The source of gluten-derived protein will be dictated upon the substrate to be coated. If the substrate contains salt on its surface, then a wheat-derived protein should be used to obtain a clear, glossy coating. Use of corn-derived proteins (e.g., zein) on a salty surface will cause the zein to precipitate. Zein can, of course, be used when gloss is not a desired property.

Edible coatings produced by the present method are clear films which are non-toxic since they are formed from naturally-occurring, gluten or gluten-derived proteins, such as prolamines, glutenins or glutelins, from corn, barley, wheat, rice or sorghum. The colloidal dispersions of the present invention do not contain toxic organic solvents or require extreme pH's, thus, the residues of these undesirable elements are minimized or eliminated. Films cast from the colloidal dispersions described herein have excellent resistance to moisture, lipid and gas permeation, provide gloss and scuff resistance to the substrate, and have excellent mechanical properties compared to water soluble proteins used as coatings.

DETAILED DESCRIPTION OF THE INVENTION

The present invention is based upon the discovery that film forming colloidal dispersions can be made from dilute aqueous acid solutions of gluten or gluten-derived protein. This is done by altering the solubility of the gluten or gluten-derived protein in a dilute aqueous acid medium. The resultant colloidal dispersion can be maintained as a stable and homogenous dispersion under ambient storage conditions without microbial contamination. Alternatively, the colloidal dispersions can be dried and rehydrated prior to use.

The term "colloidal dispersion" as used herein means a suspension of gluten or gluten-derived particles having a median volume diameter of about 10 microns or less in dilute aqueous acid medium. Preferably microparticles of wheat gluten will be from about 4 to about 5 microns and can contain a carbohydrate fraction (e.g., starch granules) that is greater than 10 microns (e.g., from about 10 to about 20 microns). The term "acid aqueous medium" refers to water or a water-based solution which contains dilute acid and which can-optionally contain alcohol (e.g., ethanol) provided that the alcohol is at a concentration or titer at which the gluten or gluten-derived protein is insoluble therein. Dilute acid means at least 0.1% weight by volume acid and preferably from about 3 to about 7% by weight of protein solids when the protein solids are about 10 to about 20% by weight. The alcohol percentage will vary depending upon the solubility of the protein selected. The terms "stable" and "homogeneous" as used herein define colloidal dispersions in which the microparticles of gluten or gluten-derived protein can remain uniformly dispersed within the aqueous medium for an indefinite period of time under storage conditions, without irreversible precipitation or agglomeration.

Gluten and gluten-derived proteins useful in the methods of this invention are found in high concentrations in various grains, such as corn, wheat, barley, rice and sorghum, and in other plant sources. Natural wheat gluten is particularly preferred in the methods of this invention. Preferred gluten-derived proteins are prolamines, glutenins or glutelins which are characterized by their insolubility in water and solubility in aqueous alcohol (e.g., aqueous solutions of alcohol containing at least 40% alcohol), and by the presence in the protein of large amounts of hydrophobic amino acids, such as leucine, proline, glutamine and asparagine. The unusual solubility characteristics of prolamines is based on the fact that they are usually deficient in polar amino acids. Examples of prolamines include, for example, zein, hordein, gliadin and kafirin. Both commercially available grades, with associated impurities, and purified forms of zein can be used. See U.S. Pat. No. 5,254,673 and U.S. Ser. No. 08/402,320 now U.S. Pat. No. 5,580,959, filed Mar. 10, 1995, which describe methods for purifying zein from corn gluten, the teachings of which are incorporated herein by reference in its entirety.

In one embodiment, colloidal dispersions of the present invention can be made by dissolving a gluten-derived protein in an aqueous alcohol medium, such as ethanol, to form a solution. The aqueous alcohol solution containing the gluten-derived protein is then admixed with an aqueous acid solution in an amount sufficient to cause the gluten-derived protein to precipitate in the form of microparticles, due to their insolubility in the water-rich mixture to form a stable colloidal dispersion. The order in which the aqueous alcohol solution of gluten-derived protein and the aqueous acid solution are admixed to each other, does not affect the final product. Further, these two aqueous solutions can be introduced to each other with minimal agitation or varying degrees of shear, such as by homogenization, without changing the properties of the resultant colloidal dispersion.

The resulting colloidal dispersion can then be treated, e.g., by evaporation or diafiltration, to reduce the amount of alcohol. The gluten-derived protein colloidal dispersion is substantially free of alcohol, that is, it contains none or only trace amounts of organic solvent. When the colloidal dispersion is applied to a substrate of choice and the water is evaporated, the particles fuse to form a continuous, transparent or translucent film. The continuity of films produced according to this invention is superior to their ethanolic counterparts.

In another embodiment, stable colloidal dispersions can also be formed by preparing a solution comprising gluten-derived protein in an aqueous alcohol medium. A suitable acid can be added, followed by addition of water in an amount sufficient to lower the alcohol concentration to a level at which the gluten-derived protein remains soluble therein. The solubilized protein is then precipitated as a stable suspension of microparticles by removing an amount of alcohol from the medium to a level at which the protein is no longer soluble therein.

For embodiments which require the use of alcohol, the ratio of alcohol to water can be determined based upon the identity of the gluten-derived protein and solubility limits therefor and can be readily ascertained. See R. A. Reiners et al., *Corn Proteins: Potential for Their Industrial Use* 58th American AAOC Meeting, St. Louis, Mo. (Nov. 4, 1973).

In a particularly preferred embodiment, colloidal dispersions can be made by dispersing wheat gluten in a dilute acid medium (preferably lactic, acetic or citric acid), under agitating conditions. At least a substantial portion of the opaque, particulate starch component is removed, gelatinized and/or partially hydrolyzed to yield a colloidal dispersion comprising gliadin and glutelins. The resultant dispersion is stable and homogeneous under typical ambient storage conditions. When coated onto a substrate, a continuous, glossy film is formed by the fusion of protein microparticles at ambient temperatures (approximately 25° C.). The term "opaque, particulate starch" is defined herein to mean the appearance of starch particles in a 2% by weight vital wheat gluten aqueous suspension, using light microscopy (200×, 100 phase contrast and polarized light).

Physical means such as centrifugation can be used to remove the opaque, particulate starch component. Alternatively, the opaque, particulate starch component can be enzymatically hydrolyzed using starch hydrolyzing enzymes such as alpha-amylases, glucoamylases and combinations thereof, to yield a translucent or clear solution. The amount of opaque, particulate starch removed or hydrolyzed can be ascertained using the modified iodine assay described in detail below in the Examples Section. The amount of residual opaque, particulate starch that is permissible in the colloidal dispersion is that which does not adversely effect the ability of the coating to become glossy on the substrate. For example, the presence of less than 15% starch or starch products would be acceptable. When using enzymatic hydrolysis to convert the opaque, particulate starch, it is necessary to heat the gluten dispersion to a temperature suitable for enzyme activation, and then to a temperature to inactivate the enzyme after the reaction is completed. The rate of enzymatic hydrolysis can be modified by pregelatinizing the wheat starch component of the gluten dispersion prior to hydrolysis and/or by debranching the starch with a debranching enzyme (e.g., pullanase).

In any of the embodiments described above, a wide variety of acids can be used to stabilize microparticles within the colloidal dispersion. Suitable organic and inorganic acids should be soluble in the medium and are selected from classes which include but are not limited to amino acids, alpha hydroxy acids, phosphoric acid, mono-, di- and tricarboxylic acids. In the case of monocarboxylic acids, any monocarboxylic acid can be used provided that it is soluble in water at greater than 0.5% by weight. Lactic acid, citric acid, acetic acid, aconitic acid or propionic acid are most preferred. The presence of acid further acts as an antimicrobial agent and thus might replace the need for additional preservatives.

The concentration of prolamine-derived protein particles in the colloidal dispersion is generally up to about 10% to about 20% by weight, with from about 10 to about 15% by weight being preferred. Higher concentrations of prolamine-derived protein can be achieved (e.g., up to about 40% by weight) if the ethanolic gluten-derived protein solution is added to an aqueous acidic solution (see Example 2). The microparticles will have a medium volume diameter of from about 10 microns or less, with about 1 micron being preferred for zein and from about 4 to about 5 microns being preferred for natural wheat gluten.

The colloidal dispersion may be further concentrated to up to about 20% by weight, by ultrafiltration, evaporation or other appropriate techniques, or reduced to a dry powder, using standard techniques such as flash drying, lyophilization or spray drying. For example, ultrafiltration using membranes having a cut-off of 300,000 NMWL (nominal molecular weight limit) or less is a preferred method of concentrating the colloidal dispersion and, at the same time, removing low molecular weight compounds dissolved in the aqueous medium. The concentrated dispersion can be diafiltered to reduce the amount of residual alcohol solvent to trace amounts. The diafiltration can be done continuously by staged addition of water or in a batch mode by constant volume batch diafiltration. Evaporation is the preferred method.

The concentrated dispersion can, optionally, be dried to a powder using techniques which will not cause the microparticles to aggregate or fuse to each other. This can be accomplished by spray drying which is preferred or by lyophilization. Alternative forms of drying, such as flash drying, fluid-bed drying, drum drying or spray drying can be used as long as the microparticles do not aggregate or fuse to each other. The drying method will depend upon the protein or prolamine used. This powder can then be stored and handled without refrigeration or other special handling procedures. Rehydration can be accomplished by adding the powder to water, or an aqueous medium, with agitation sufficient to resuspend the protein particles and form a colloidal dispersion that is similar to the never dried colloidal dispersion and resultant film therefrom. The ratio of powder to water will depend upon the concentration of the final reconstituted product which is desired.

In one embodiment, waxes can be added to the colloidal dispersions of this invention in the form of a wax latex or emulsion. Methods for making wax latices or emulsions are described in detail in U.S. Ser. No. 08/311,930, the teachings of which are incorporated herein in their entirety. The wax latex or emulsion can be combined into the colloidal dispersion, under agitating conditions (e.g., high shear), until a homogeneous suspension is reached.

The properties of the dispersion can be modified for a given application. Such modifications can produce a coating having enhanced water barrier properties or mechanical flexibility. The desired mechanical properties will depend upon the substrate to be coated but in any event should withstand the normal stresses encountered during the coating process, the subsequent shipping and handling of the food, and should maintain the food's integrity and barrier properties over storage. One method of modifying is to incorporate additives into the colloidal dispersions.

Examples of suitable additives include waxes (e.g., rice bran wax, candelilla wax, beeswax, paraffin wax, japan wax, ceresin wax, carnauba, microcrystalline wax, sugarcane wax and petroleum wax), oils and/or surfactants, e.g., acetylated glycerides, or diacetyl tartaric acid esters of mono- and di-glycerides (DATEM esters)) can be incorporated to improve the water resistance; and glycerol, propylene glycol or polyethylene glycols can be used to plasticize the film. Flavors, colors, antioxidants and/or preservatives can-also add useful functionality to the films. Additives which are soluble in water can be incorporated in the coating formulation by direct dissolution in the aqueous medium of the colloidal dispersion. Additives which are insoluble in water may be dispersed by surfactants and added as an emulsion or colloidal dispersion. Examples of insoluble additives include but are not limited to flavors, trace minerals, vitamins, nutrients or nutraceuticals (e.g., vitamin A, vitamin E).

Water insoluble additives as described above can be incorporated in the microparticles by dissolving or dispersing the additive in the alcoholic gluten-derived protein solution prior to the precipitation process in which the colloidal dispersion is formed. The additive, when incorporated in the gluten-derived protein microspheres, can be either evenly distributed throughout the sphere, in the center of the sphere or on the surface of the sphere, depending on the chemical nature of the additive. Alternatively, the additive may form microspheres or droplets separate from the protein microspheres.

The properties of the product can be influenced by chemical modification of the proteins. Such modifications can include, for example, treating the proteins with an acid, base or other agent which alters the structure of one or more of the amino acid side chains, which, in turn, alters the character of the protein. For example, the high glutamine and asparagine content of prolamines, particularly zein, provides a means for manipulating the charge characteristics of the protein by deamidation, thereby providing a wide range of hydrophobicity. The preferred deamidation method involves mild acid-catalyzed deamidation (at a pH of about 1) at elevated temperatures (e.g., from about 25° C. to about 65° C.) for a period of time sufficient to accomplish the desired level of deamidation. The deamidation process may be followed by measuring the release of ammonia with an ammonia electrode. Deamidation is controllable, and may be terminated by the addition of ammonium carbonate or other base. Other examples of chemical modification include esterification of the protein with fatty alcohols, or acylation of the protein with fatty anhydrides.

The colloidal dispersions can be used in various applications in the food and pharmaceutical industries, including as edible coatings or barriers in foods or drugs. Suitable substrates include but are not limited to confections, raw, cooked and dehydrated meats, dessert items, snack foods (e.g., pretzels, tortillas, chips), candies (e.g., chocolates), fruit (e.g., raisins), vegetables, baked goods (e.g., buns, pastries, bagels, breads), cereals, seeds, nuts (e.g., peanuts, cashews, almonds, macademia), beans (e.g., coffee beans), vitamins, tablets, cheeses (e.g., low fat cheeses) and fried foods (e.g., french fries).

For food and drug purposes, the coating should impart neither significant flavor nor color, so that it does not substantially alter the flavor or appearance of the food or the drug product. Some commercial preparations of glutenderived proteins may impart a yellow color to the protein suspension or may have an objectionable odor and/or flavor. To eliminate this problem, the proteins may be decolorized and/or deflavored according to the methods of U.S. Pat. Nos. 5,021,248, 5,254,673 and U.S. Pat. No. 5,580,959.

The edible coating or barrier can be applied to the substrate of choice by any suitable method. Examples of suitable methods include spraying, dipping, pouring, brushing, rolling, extrusion, coprecipitation, or as a composite, whose rheology and composition allows it to be extruded as a film. To suit the particular method selected, it may be necessary to adjust the viscosity of the dispersion by temperature control or the addition or deletion of the plasticizer. For example, it is generally necessary to add plasticizer to the dispersion to aid in drying at ambient temperature and to enhance gloss. The gluten-derived protein colloidal dispersion is applied to the substrate and dried at ambient temperature to evaporate the water and cause the microparticles to fuse or coalesce into a continuous film.

The present method using a water-based gluten-derived protein colloidal dispersion has several advantages. The colloidal dispersion can be used directly or can be dried to form a stable powder which can be readily reconstituted with water, or other aqueous medium, prior to use. The colloidal dispersion is stable and homogeneous under storage, and due to the presence of the dilute acid inhibits microbial contamination in the absence of antimicrobial agents. The colloidal dispersion forms a continuous, durable film upon curing which is colorless, odorless, bland to the taste, non-toxic and provides gloss. The degree of gloss properties of the film is that defined according to generally accepted terms of the painting industry, e.g., matte, semigloss, high gloss. The degree of gloss will be dependent upon the substrate to be coated.

The colloidal dispersions of this invention can function as an adhesive for adhering edible particular material onto the substrate's surface. An "edible particulate material" is defined herein to be any edible thing that can be added to the substrate's surface for the purpose of ornamentation, flavoring or coloration. The exact nature of the particulate material will depend upon the food to be coated. Examples of edible particulate materials include, but are not limited to, fruit pieces, confections (e.g., candies, sprinkles), seeds, salt, spices, and combinations thereof. The edible particulate materials can be applied to the substrate immediately upon coating the substrate with the colloidal dispersions of this invention. Alternatively, the substrate can be coated with the colloidal dispersion and allowed to partially dry until the coating is tacky, then the particulate material(s) can be applied. The later method is preferred when the colloidal dispersion is obtained from corn-derived proteins and the particulate material is salty, in order to minimize/avoid protein precipitation.

The film can be applied to foods to form an edible barrier to moisture, lipid, gases and/or other additives, such as colors, flavors, antioxidants and/or preservatives. The edible coating is particularly useful in prepared foods which are stored for a period of time prior to use. Likewise, the present gluten-derived protein coating can be used in other food systems (e.g., heterogeneous) where it is desirable to prevent migration of components such as keeping moisture from escaping or migrating within the systems, or preventing colors and/or flavors from blending. In drug applications, a gluten-derived protein coating can be applied to tablets for oral ingestion and enteric coatings, for example, to provide a barrier between the drug and air or moisture.

Film properties of the gluten-derived protein coating can be modified by controlling the concentration of gluten-derived protein in the colloidal dispersion, the mode of application and the number of layers applied. For example, where a thicker coating is desired, either a colloidal dispersion having a higher gluten-derived protein concentration or multiple layers can be applied. If multiple layers are applied to the substrate it is important to insure that the final coating is continuous to provide adequate barrier and mechanical properties.

The film formed from the present gluten-derived protein colloidal dispersion is superior to solvent-cast gluten-derived protein films. Films cast from the dispersions of this invention were more dense, homogeneous and provided higher gloss than their ethanolic counterparts.

The invention is further illustrated by the following examples:

EXAMPLES

Materials

Zein was prepared according to U.S. Pat. No. 5,254,673 as described in Example 1. Vital Wheat Gluten was obtained from Manildra Milling Corp (Shawnee Mission, Kans.). Beeswax, Candelilla and Rice Bran waxes were obtained from Frank B. Ross Co., Inc. (Jersey City, N.J.). ALDO™, glyceryl monolaurate from Lonza (Fairlawn, N.J.), cocoa butter (Cacao Industrias, S.A; Peru), CRISCO™ produced by Proctor & Gamble, Durkex 100 oil (Van den Bergh Foods, Inc., Rockville Center, N.Y.), lactic acid, citric acid, malic acid, glutaric acid, fumaric acid, acetic acid, phosphoric acid, transaconitic acid, glycyl glycine, pectic acid, cysteine, triethanolamine and ammonium chloride were obtained from Aldrich Chemical Co. (Milwaukee, Wis). Freeman Zein 4000 was obtained from Freeman Industries, Inc. (Tuckahoe, N.Y.). Crude barley protein was obtained from Alko Ltd. (Arjmaki, Finland). Glucoamylase (Diazyme L-200), alpha-amylases (Clarase L-40,000, Termamyl and Takalite) and pullanase (Optimax L-300) were obtained from Solvay Enzymes, Elkhart, Ind. All percentages in the examples are by weight unless otherwise specified.

Product Characterization

A. Film Properties

1. Physical

ASTM methods were used for measuring drying time (ASTM D1640), gloss (Byk Gardner MicroTri-Gloss glossimeter) (ASTM D523-95), cross-hatch film adhesion (ASTM D-823), Gardner Mandrel flexibility (ASTM D-823), and hardness (ASTM D3363-74).

Gloss was also measured on a hamburger bun as a practical index of its potential as a baking glaze. This was done by brushing a light coating on the surface of the bun and then monitoring the rate of drying, dried film continuity, clarity and gloss.

The particle size and shape distribution for the protein, polysaccharide, wax and/or lipid microparticles were determined using a Microtrac Particle Size Analyzer (Leeds & Northrop Instruments, North Wales, Pa.) or a light microscope (Olympus, BH-2) equipped with a BioScan Optimas Image Analyzer.

Film ultrastructure: the zein, wax and wheat protein films were dried on microscope cover slips at 25° C. then broken in half and visualized in cross section using standard Scanning Electron Microscopy (SEM) techniques (1,000× and 5,000×). In all cases, the films were much more dense and homogeneous than their ethanolic counterparts. The latter contained many void spaces and artifacts which occur during drying. The zein films dried from ethanol had large void spaces, often having diameters of 3 to 5μ. By contrast, the dried films prepared using aqueous-zein colloidal dispersions of this invention typically have no voids or porosity which can be discerned by SEM even at 5000×. The aqueous, colloidal dispersion of zein, dried with the same solids content produced films which are more compact (approx. 6μ) vs 10μ for their ethanolic counterparts. It should be noted, however, that the surfaces of each type of film were comparably smooth. Films cast from aqueous, gliadin colloidal dispersion, dried as above and examined by SEM (1000× and 6,250×) were more dense and homogenous than their ethanolic counterparts, which had void spaces and vacuoles which could be approximately 3μ and up to 10μ in diameter (equal to the film thickness). In contrast, the wax colloidal dispersion, prepared as described in Example 12, dried under ambient temperature conditions, fused only partially. As a result, porosity was noted both in the dried film surface and cross-section (evident at 100×, but readily measured at 2,500× and 6,250× to be 3 to 7μ or approximately one half the film thickness, but typically less). The porosity resulted from incomplete particle fusion and can be adjusted by heating and increasing the low melting point (<25° C.) lipid/wax ratio. The mixed wheat glutenin and gliadin dispersion produced a dry film (approx. 8μ) which was less prone to cracking than gliadin alone and had a smooth surface. In addition, small pores (approx. 0.1 to 0.5μ) were seen if the dispersion was not fully degassed.

2. Chemical

A modified iodine test was done by taking 5–7 drops of wheat gluten glaze suspension, and diluting it with 1 ml of water in a small test tube. The liquid was then boiled for several seconds using a bunsen burner flame. The tube was cooled with tap water followed by adding 1–2 drops of a solution containing 0.5% iodine and 0.5% potassium iodide in 50% ethanol. If starch is present a blue color develops (i.e., positive test). If starch is absent, a yellow color develops (negative test). A green color is indicative of a product containing residual or borderline amounts of starch.

3. Sensory

Films were prepared from each coating by drying a suspension containing 0.5 grams of total solids in a plastic weighing dish at room temperature. Each film was chewed by a member of the sensory panel and off-flavor and residual acid were evaluated and compared to calibrated references. The films were scored on a scale of 1 to 10, where 10 represented strong off-flavors and residual acid; 1 represented minimal off-flavor and residual acid; 10 represented interior mouth clearing and 1 represented rapid mouth clearing. The reference materials were scored as 6 and 10 for 0.125% acetic and 0.125% lactic acid solutions, respectively.

Example 1

Formation of Acidic Zein Colloidal Dispersion

A zein solution (10% solids) in 80% ethanol: 20% water (v/v) was slowly added to an equal volume of dilute acid (2% citric acid) without any agitation. No coagulation occurred, as would be expected from lowering the ethanol titer below the minimum solubility of zein (55% titer). Instead, an ethanolic zein layer formed on top of the aqueous acidic layer. At the interface, a thin, white layer began to form. When stirred gently, this layer dispersed into the lower aqueous phase, transforming it from clear to translucent and, ultimately, opaque. As gentle stirring proceeded, the supernatant ethanolic layer diminished and, in minutes, vanished as the milky opacity in the aqueous phase reached a maximum opacity.

Example 2

Formation of Acidic Zein Colloidal Dispersion and Film Therefrom

A 2% citric acid solution (100 ml) was added to an equal volume of zein solution (10% solids) in 80% ethanol using a magnetic stirring bar agitated at medium speed. As the acidic aqueous solution made contact with the ethanolic zein solution, a localized cloudiness formed which was immediately dissipated by stirring until the titer reached approximately 55%, at which point the colloidal dispersion of the zein remained as a stable suspension. The addition rate was 25 ml/min. The residual ethanol was then removed on the rotor evaporator (29 inches Hg and 45° C.) to yield a stable zein suspension having a particle size of 0.2μ (mean volume; mv). No subsequent settling of particles or shift to a larger mean particle size was noted after 2 months at room temperature. Also, without any added antimicrobial agents, no microbial growth was noted after prolonged storage at room temperature.

When several milliliters of this zein colloidal dispersion were placed on a standard coating board and spread to a 3 mil thickness with a Bird film applicator, the resultant fluid film dried to a clear, glossy layer (see Table I).

Example 3

Colloidal Dispersion Formation During Ethanol Evaporation

Method 1: Two hundred grams Vital wheat gluten were dispersed in 1600 ml of 80% ethanol (12.5% w/v), heated 30 min (40° C.), centrifuged (5000 rpm; 10 min.) and gravity filtered (Fisher P4 filter paper; medium fine porosity) to yield 1000 ml of gliadin extract (8.4% solids, w/v). Ten grams of lactic acid were then added with stirring followed by the gradual addition of 300 ml of distilled water. Before placing the solution on a rotary evaporator, a drop or two of a suitable antifoam, such as decanol was added. The ethanol was then evaporated which resulted in formation of a colloidal gliadin dispersion in aqueous ethanol. When the solubility of gliadin was exceeded no agglomeration was observed. The resultant product had a gliadin concentration of 19.4% and a volume of 400 ml due to azeotropic distillation of water. When diluted to 10% solids with water, this preparation became whiter but formed films which were equivalent in performance and properties to those prepared according to Example 2. The higher solids concentration made it possible to coat substrates in one coat which previously would have required two or more coats. This process was much more efficient than methods which could not achieve higher concentrations without distillation of substantial amounts of water after formation of the colloidal dispersion. The latter process is inefficient from an energy standpoint and also tends to thermally destabilize the colloidal dispersion.

Method 2: To a stirred 10% solution of zein (80% ethanol; 200 ml) was added 2 grams lactic acid, followed by the gradual addition of 100 ml distilled water. Two drops of decanol were then added as an antifoam and the resultant, minimum titer solution (53%) of zein was then placed on a rotary evaporator and the ethanol evaporated. When the solubility of zein was exceeded, a white, colloidal suspension formed which was stable despite its high, final concentration (20% w/v).

Example 4

Formation of a Gliadin-Based Colloidal Dispersion and Film Therefrom

Fifteen grams vital wheat gluten powder were dispersed in 100 ml of 73% ethanol and heated to 40° C., with magnetic stirbar mixing for 30 minutes. The resulting mixture was centrifuged (1000 rpm, 5 min.) and the residue discarded. The supernatant was cloudy and microscopic examination using polarized light revealed crystalline, starch particles. These starch particles were removed by gravimetric filtration through a fine porosity filter paper (Fisher P4, medium fine porosity). The filtrate (80 ml; 5.5% solids) had the equivalent of a 29% yield of gliadin. The filtrate was concentrated by vacuum distillation of ethanol and azeotroped water until the solids were 8%. This required addition of a small amount of absolute ethanol to maintain gliadin solubility. The gliadin colloidal dispersion was formed by addition of the 8% gliadin solution into an equal volume of stirred lactic acid (2%, 25° C.). A stable and translucent colloidal dispersion was formed immediately and remained free of microbial growth for months at ambient storage conditions.

The colloidal dispersion was cast as a thin film on a coating board as described in Example 2. The resultant film was clear and glossy. A similar film was cast on a bagel or baked surface and produced a high gloss finish. On a chocolate bar, high sugar confection, or apple, it also produced a high shine. When the colloidal dispersion was dried in a nonstick muffin pan (2 ml at 25° C.), the resultant film contained microcracks and was extremely brittle. Addition of high molecular weight plasticizers to the colloidal dispersion, like polyethylene glycol (PEG) 3000 (10% based on protein solids), reduced or eliminated this defect caused by drying the colloidal dispersion to a film.

Filter papers (53 mm diameter) were coated (62 mg) with either colloidal dispersions of zein or gliadin, dried (50° C. to constant weight) and then placed over a tared water vessel containing a known weight of water. The observed weight loss after 65 hours was used as an index of relative water barrier properties. Films cast from the zein colloidal dispersion had a weight loss of 42 mg/hr. Films cast from gliadin colloidal dispersions had a weight loss of 58 mg/hr.

Example 5

Relative Colloidal Dispersion Formation Efficacy of Different Acids on Colloidal Dispersion Formation A representative sampling of organic and inorganic acids in water were prepared according to Example 1 to determine their relative efficacy as gluten-derived protein colloidal dispersion stabilizers. Lactic acid, citric acid, malonic acid, malic acid, glutaric acid, transaconitic acid, phosphoric acid, cysteine, ascorbic acid, fumaric acid, benzoic acid, acetic acid, propionic acid, sorbic acid and close analogs were tested. This heterogeneous set of acids spans several different categories: amino acids, alpha hydroxy acids, tricarboxylic acids and low molecular weight monocarboxylic acids. There was no apparent correlation with the stability of the colloidal dispersions between either pH or ionic strength, as measured by conductivity.

Example 6

Zein/Cocoa Butter Composite Film

Ten grams cocoa butter were comelted with glyceryl monolaurate and dispersed in hot water (80° C., 100 ml) and then homogenized (10,000 rpm) for 2 minutes. The emulsion was placed on an ice bath and the homogenization was continued until the water temperature was about 10° C. which insured that the liquid phase had solidified.

The resultant cocoa butter latex was then combined with a zein colloidal dispersion made in 2% citric acid (as described in Example 1 or 2), with no coagulation. The suspension was readily mixed and concentrated by centrifugation to yield a uniformly mixed zein/cocoa butter composite. When the freshly mixed suspension was simply air dried (without centrifugation) an opaque, cocoa butter-flavored film resulted.

Various GRAS waxes (rice bran, Candelilla and beeswax) were also formed into latices alone or in combinations as described in U.S. patent application Ser. No. 08/311,930 and incorporated herein by reference in its entirety. These preparations were all intermiscible with each other and with the above acidified colloidal dispersions. Films dried from them were expected to exhibit enhanced water barrier properties. Their sensory properties were better, in that it was easy to bite cleanly through the films due to their enhanced plasticity.

Example 7

Antimicrobial Functionality of Coatings Cast from Acidic Colloidal Dispersions

Gliadin colloidal dispersions were prepared in acetic, lactic, erythorbic, sorbic, ascorbic and citric acids according to the method of Example 2. Baked goods coated with these colloidal dispersions showed increased resistance to mold at ambient temperature and had better gloss, compared to both uncoated controls and counterparts coated with neutral pH caseinate-based or soy-based coatings. The amount and type of acid used allows blends to be made which meet both antimicrobial and sensory objectives depending upon the desired end use and product to be coated.

Example 8

Lactic Acid Stabilized Wheat Gluten and Film Therefrom

To a 4% lactic acid solution (100 ml) was added vital wheat gluten (4.4 grams) with vortex stirring (30 min). The evenly dispersed suspension was then homogenized (12,000 rpm, 3 min.) despite some foaming. The dispersion had a low viscosity and was sprayable. Unlike a typical dough preparation minimal swelling of the proteins had occurred.

When cast on a black coating board, the suspension dried to a white, partially fused, opaque film. When the dispersion was placed on a heated hamburger bun it dried to a matte finish and had no gloss.

A wide variety of plasticizers were added to the preparation in order to produce a clear or glossy coating. These plasticizers include the following substances: ethanol (10–50%), additional lactic acid (4%), polyethylene glycol (PEG) (1%; molecular weight 3,400), 2-propylene glycol (1%), arabinogalactan (2%), urea (2%), soy protein (2%) and sorbitol (2%). Only 2-propylene glycol and arabinogalactan resulted in any improvement in the gloss. Even together these still did not give a high gloss finish on baked goods or other surfaces.

The homogenized and acidified wheat gluten suspension was then centrifuged (500 rpm; 10 min.) resulting in a small amount of white starch sediment. Centrifugation was repeated (1000 rpm; 10 min.) and a larger white centrifuge cake was isolated. The supernatant suspension was still opaque but produced a high gloss shine on baked goods, chocolate, apples and confections. When a thin film of this translucent colloidal dispersion was cast on a black coating board as described in Example 2, it yielded a translucent, cloudy film.

Example 9

Scaled-up Process for Making Lactic Acid Stabilized Wheat Gluten and Film Therefrom To 400 ml of distilled water was added 16 grams lactic acid to form a dilute acid solution. Vital wheat gluten (62.4 grams; approximately 15% w/v) was then dispersed into the dilute acid solution with vortex mixing. A few drops of dodecanol was added as an antifoam and the suspension was homogenized (10–15,000 rpm) for 5 minutes. The suspension was transformed from a dull gray to a off-white appearance. To fully deaerate the suspension it was then stirred briefly (10 min.) with a stirbar. The suspension was filtered through cheesecloth and the filtrate centrifuged for 10 minutes at 2000 rpm. The supernatant was decanted and the white starch cake was discarded (any brown/tan sediment contains wheat protein(s) and can be resuspended by gentle shaking). The average particle size of this preparation was about 4 to 6 microns.

When this gliadin and glutenin-rich suspension was cast on a bagel, chocolate bar, apple, high sugar confection, zucchini squash, coffee bean or analogous substrate, it produced a high gloss coating which was strong and non-tacky at room temperature. When a 15% suspension (2 ml) was dried at 25° C. in a nonstick muffin pan, a strong, semi-flexible film resulted which exhibited no evidence of microcracks, unlike the gliadin colloidal dispersion described in Example 4.

Filter papers (53 mm) coated (92 mg) with either purified zein prepared according to U.S. Pat. No. 5,254,673 or with the purified wheat protein suspension prepared as described above, were used to seal tared containers of water. The relative water barrier properties of each coated filter paper was compared with an uncoated filter paper control over 23 hours. The control exhibited a weight loss of 108 mg/hr; the zein coating exhibited a weight loss of 20 mg/hr; and the wheat protein glaze exhibited a weight loss of 27 mg/hr.

Example 10

Minimizing Acid Taste in Films Cast from Aqueous Colloidal Dispersions

Zein, gliadin, or wheat protein colloidal dispersions (10% solids) were formed using lactic acid concentrations of 0.5% using the methods described in Examples 2 and 8. This resulted in a major reduction in residual acidity in the dried films. At a 1% lactic acid level, the wheat protein colloidal dispersion had a pH of 3.4 but did not have a significant acid flavor when dried. Film cast from the zein dispersion still exhibited a significant acid flavor at the 1% lactic acid level.

The use of a more volatile acid, like acetic acid, minimized residual acidity in the dried film at all acid concentrations tested (0.5 to 4%). The amount of residual acidity observed depended on both the drying temperature and curing time.

Example 11

Barley Gluten Glaze

Using the methods described in Examples 8 and 9, a crude barely protein was dispersed in 4% lactic acid, homogenized (12,000 rpm) and centrifuged (1,200 rpm) to obtain a supernatant colloidal suspension which could form a glaze. As described in Example 8, the gloss of the glaze was improved by removal of the starch fraction. The glaze was applied to hamburger buns, bagels, and a standard coating board. As with some other baking glazes, this glaze was cloudy on the standard Leneta Coating Board.

Example 12

Formation of a Stable Wax Latex

Rice bran wax (32 grams), CRISCO® (12 grams), and glyceryl monolaurate (GML; 11 grams) were comelted at 90° C. and added to 375 ml of distilled water which had been heated to boiling. The melted lipids were poured into the water phase and stirred with a spatula until they dispersed as a yellowish cream. The solution was then reheated to boiling in the microwave and restirred. The crude emulsion was then homogenized using a POLYTRON® homgenizer (10,000 rpm; 4 min) resulting in a white emulsion. While still homogenizing, the emulsion was cooled in an ice bath until the temperature was below 20° C. At this point, the emulsion was converted into a stable latex whose particles would not coalesce until the liquid phase was removed. The resultant wax/lipid latex creams on standing for days but can be readily resuspended as a uniform colloidal dispersion by gentle swirling or shaking.

Reduction of the wax ratio and use of lower melting point lipids produces wax latices which were more prone to fuse at ambient temperature. The following formulations and the above procedure produces a latex that fuses at ambient temperature: beeswax (4.5 grams; 15%), Durkex 100 oil (13 grams; 46%), coconut oil (2.4 grams; 8%), NEOBEE™ M-5, a medium chain triglyceride (9 grams; 30%) and glyceryl monolaurate (GML) (0.3 grams; 1%).

Example 13

Composite Protein-Lipid Films

To an 8×18 cm (i.d.), non-stick bread pan, was added 50 ml of a 50:50 mixture of aqueous, zein colloidal dispersion (10% solids), and the aqueous wax/lipid latex (approx. 14% w/v), prepared as described in Example 8 containing CRISCO®. After drying at ambient temperature overnight, the resultant film was found to have a pie crust texture and was readily chewable. By contrast, 100% zein films, dried from the same 10% colloidal dispersion of zein, were tough and extremely difficult to bite.

The fact that the wax latices can be readily mixed with the colloidal dispersions of zein, gliadin, and glutenin/gliadin without precipitation of any components makes uniform distribution of these otherwise immiscible materials easy. As a result, the textural properties of the films can be easily modified by blending stock suspensions of the various colloidal dispersions described in the previous examples.

Example 14

Comparison of Film Performance Produced from Various Colloidal Dispersions and Commercial Glazes Colloidal dispersions made according to this application and commercially available glazes were studied for gloss at 20° C., the dry through time (measured in seconds) and the ratio of volatile organic chemicals (V.O.C.) (i.e., any organic substance that has a boiling point at or below the boiling point of water). Table I summarizes the results. The results show that while the ethanolic protein solutions have faster dry through times, the residual organics in the film were significantly high compared to the colloidal dispersions made according to this invention. The results further show that water-based dispersions provide better gloss than their ethanolic counterparts or water soluble proteins.

TABLE I

| Sample | Gloss (@ 20°) | Dry thru time (seconds) | V.O.C./solids ratio |
|---|---|---|---|
| Freeman Zein 4000; Commercially avail. 80% EtOH | 37 | 35* | 80:10 |
| OptaZein; 80% EtOH | 40 | 47* | 80:10 |
| OptaZein; Colloidal Dispersion; 95+% H₂O (Ex. 2) | 45 | 150 | 5:10 |
| Gliadin Colloidal Dispersion 95+% H₂O (Ex.4) | 54 | 285 | 5:10 |
| Gliadin Colloidal Dispersion + PEG 400 (10%) (Ex. 4) | 62 | 285 | 4:11 |
| Golden Glo ™ Caseinate/H₂O Baker's Glaze Commercially avail. (premade glaze) | 41 | 285 | 0:10 |

*dried at 50° C.; all other samples were dried at 25° C.

Example 15

Alpha-Amylase(AA) and Glucoamylase(GA) Hydrolysis of Wheat Gluten Starch to Produce a Stable, Baking Glaze

Powdered Vital Wheat Gluten (VWG; 62 grams) was added to 450 ml of water containing 3.1 grams of acetic acid (5% of VWG) and stirred for 2 hours to produce a 12% solids suspension of protein and starch microparticles. The acidic mixture (pH 3.9) was then heated to 55° C., followed by addition of 0.4 ml of glucoamylase and 0.4 ml alpha-amylase (Clarase). Within 15 minutes of adding the enzymes, the viscosity of the VWG suspension dropped dramatically. After 1.5 hours, the modified starch iodine test (procedure described above under "Product Characterization" Section) was negative. The mixture was then heated to 95° C. for 10 minutes to inactivate the enzymes and then cooled to 25° C.

After air-drying on hamburger buns, the product produced a clear, high gloss glaze. The resultant VWG suspension did not settle or exhibit microbial contamination even after storage at room temperature for two weeks.

Example 16

Pre-gelatinizing Vital Wheat Gluten Starch to Accelerate Enzymatic Hydrolysis

VWG powder (1,817 grams) was added to acidified water (126 grams glacial acetic acid; 9411 grams water; 7% w/w acetic acid on the basis of VWG) over the course of 15 minutes. The slurry was then heated to 69° C. to 72° C. for 30 minutes to gelatinize the starch. The temperature was reduced to 54° C. to 56° C. and 15 ml of alpha-amylase (Clarase) and 15 ml glucoamylase were added to initiate the starch hydrolysis. The stirred slurry was maintained at this temperature for 4 hours. The modified starch iodine test was negative. The suspension was then heated to 98° C. for 5 minutes to thermally inactivate both enzymes, and then cooled to 30° C. to 35° C. before the addition of sodium benzoate (5.7 grams). The resultant suspension was passed through cheese-cloth to yield 9,226 grams of wheat gluten glaze (pH 3.9, 18.4% solids, 93.4% yield).

When tested on the surface of hamburger buns this wheat gluten glaze produced a clear, high gloss shine. The stable suspension (no setting with time) can be stored at room temperature (or refrigerated). Reduced (50%) microbial growth compared to uncoated buns was observed over about six weeks.

Example 17

Use of Alpha-Amylase Alone to Produce the Wheat Gluten Glaze

VWG powder (216 grams) was added to acidified water (15.1 grams glacial acetic acid; 969 grams water; 7% w/w acetic acid based on VWG with stirring. The slurry was then heated to 70° C. to 72° C. for 30 minutes to gelatinize the starch. The solution was cooled to 50° C. and 3.4 ml of alpha amylase (Clarase) was added followed by continuous stirring for 4 hours. Aliquots from this suspension still tested positive in the modified starch iodine test. Nevertheless, the film has good clarity, gloss and a rapid dry time on the hamburger bun. The suspension was heated to 92° C. for 15 minutes to inactivate the AA enzyme. Following this, it was cooled to approximately 35° C. and 0.75 grams of sodium benzoate (in 10 ml water) was slowly added with vortex-stirring. The low viscosity suspension was then passed through cheesecloth to yield 1,208 grams of wheat gluten glaze (16% solids, 89.4% yield).

The vital wheat gluten glaze made with only the alpha amylase provided a good gloss on the hamburger bun but the glaze was prone to solidifying on standing at room temperature (approximately 4 days). The resultant paste was shear-thinning (i.e., viscous suspension but liquified upon shaking) and had lost some of its gloss and clarity. The paste could not be fluidized by further acidification with acetic acid or by heating.

Example 18

Use of Glucoamylase Alone to Produce the Wheat Gluten Glaze

VWG powder (90 grams) was added to acidified water (2.7 grams glacial acetic acid; 407 grams water; 3% acetic acid w/w based on VWG) to produce an 18% solids suspension which was stirred until homogeneous. The suspension was then heated to 60° C. to 62° C., and 0.5 ml of glucoamylase was added. The stirring was continued at this temperature. The modified starch iodine test was negative at the end of the 4 hour incubation. The enzyme was inactivated by heating the suspension to 98° C. for 3 to 4 minutes and then cooled to ambient temperature. The yield was 380 grams of wheat gluten glaze (22% solids, 93% overall yield).

On the hamburger buns, however, the wheat gluten glaze produced with glucoamylase alone gave a matte non-glossy finish even though the drying time and nonstickiness of the dried film were comparable to the best wheat gluten glaze produced by Example 15. Unlike the wheat gluten glaze produced by alpha amylase alone (Example 17), this preparation did not thicken or gel after storage for 5 months at room temperature.

Example 19

Substitution of Hydrochloric Acid for Acetic Acid to Produce Wheat Gluten Glaze Using Both Alpha Amylase and Glucoamylase

VWG powder (150 grams) was dispersed in acidified water (1.7 ml of concentrate hydrochloric acid in 850 grams water) until a well-mixed, 15% solids suspension was produced. The suspension was then heated to 90° C. to 92° C. for 2 hours, cooled to 54° C. to 56° C. followed by addition of 1 ml of alpha amylase and 1 ml of glucoamylase. The resultant mixture was stirred for an additional 3 hours at 55°±1° C. The modified starch iodine test was negative. The enzyme was inactivated by heating to 95° C. for 5 minutes. The suspension was cooled and then passed through cheese-cloth to yield 890 grams of wheat gluten glaze (pH 3.9; 15.5% solids, 92% overall yield).

The glaze gave a good gloss on hamburger buns and had other characteristics similar to the glaze produced in Example 16.

Example 20

Substitution of Propionic Acid for Acetic Acid to Produce Wheat Gluten Glaze Using Both Alpha Amylase and Glucoamylase

VWG powder (192 grams) was dispersed in acidified water (13.4 grams propionic acid; 995 grams water; 7% w/w acid based on VWG). The slurry was heated for 30 minutes at 75° C. to 78° C. to gelatinize the starch, followed by cooling to 54° C. to 56° C. and the addition of 1.6 ml alpha amylase (Clarase) and 1.6 ml glucoamylase. The temperature was maintained at 55° C. and the hydrolysis step continued for 4 hours, at which point a negative starch iodine test was obtained. The mixture was then heated to 90° C. to 93° C. for 15 minutes to inactivate the enzymes and then filtered through cheesecloth to yield 1114 WGG (pH 4.1, 16% solids, 93% yield).

The glaze gave a good gloss on hamburger buns and had other characteristics similar to the glaze produced in Example 16.

Example 21

Use of Thermally Stable Alpha Amylases to Produce Wheat Gluten Glaze

Two alpha amylases (Termamyl and Takalite) with higher thermal stability than Clarase were used in the procedures of Example 17 described above with the following modifications: less acid was used (3% w/w based on VWG) to raise the pH to the pH optima of the enzymes and calcium chloride was added due to the dependence of the enzymes on this action. Using either enzyme the product became a completely unworkable dough which could not be reversed by heating but which was amenable to treatment with Clarase and glucoamylase as described in Example 15. This product was a much finer suspension with properties similar to the glazes described in Example 15.

In one example, 15 grams VWG was added to acidified water (3% w/w glacial acetic acid based on VWG) which also contained 1 mg of calcium chloride in 85 ml of distilled water. The 15% solids slurry was heated to 80° C. to 85° C. for 20 minutes and then either cooled to 39° C. to 41° C. or maintained at 80° C. to 85° C. before addition of 0.125 ml of Termamyl. In either case, after one hour of constant stirring, a dough-like agglomerated product was obtained. The suspension dried slowly and gave a dull, matte finish on hamburger buns. However, addition of 0.125 ml of alpha amylase (Clarase) and glucoamylase to this curd-like intermediate, resulted in a substantial viscosity drop after 2 hours and the resultant product dried reasonably fast and gave a medium gloss on the hamburger bun.

Example 22

Use of a Debranching Enzyme to Accelerate the Production of the Wheat Gluten Glaze VWG (180 grams) was added to acidified water (5.4 grams glacial acetic acid; 1015 grams water; 3% based on VWG), using mechanical stirring, until well dispersed. The slurry was then heated to 75° C. to 77° C. for 30 minutes to gelatinize the starch followed by cooling to 59° C. to 61° C. and the addition of 1.2 ml of pullanase and 1.2 ml of glucoamylase. The mixture was allowed to digest for 40 minutes. Aliquots were tested on the hamburger buns and dried slowly to a turbid, non-glossy surface. Addition of 1.2 ml of pullanase resulted in no change in viscosity. The stirring was continued for an additional 2 hours and 10 minutes but the suspension was still very viscous and gave positive starch iodine test. The gloss on the hamburger buns was poor.

When 1.2 ml of alpha amylase (Clarase) was added, within 30 seconds the viscosity of the suspension dropped dramatically and after 3 hours, the modified starch iodine test was negative. After 4 hours, the suspension was heated to 93° C. for 10 minutes to inactivate the enzymes and cooled to 30° C. using ice water bath. Sodium benzoate solution (0.6 grams in 10 ml water) was added along with 7.2 grams of additional acetic acid (i.e., 4% w/w based on VWG) to bring the total acid content up to 7% w/w based on VWG (and pH down to 4.0). The yield of wheat gluten glaze, by this method, was 1156 grams (14.3% solids, 91.8% overall yield).

The final product gave a good gloss on the hamburger bun and had properties similar to the preparations described in Examples 16 and 17.

Example 23

Effect of Enzyme Concentration and Post-Hydrolysis Storage Temperature on Stability of the Wheat Gluten Glaze Fresh, undenatured enzymes (see Table II) were added to a 15% solids wheat gluten glaze made according to the procedure of Example 16. They were added at multiples of the standard stoichiometry and aliquots were then stored at both 5° C. (i.e., refrigeration) and 25° C. (ambient). The results are given in Table II. When fresh Clarase enzyme was present, the viscosity of the wheat gluten glaze preparation increased quickly and gelled in 5 to 10 days at 25° C. but did not gel for more than a month at 5° C. The glucoamylase did not contribute to this viscosity build-up or gelation. When the Clarase enzyme was thermally treated in the absence of the wheat proteins, its addition to the wheat gluten glaze preparation caused no viscosity increase or gelation. When Clarase was thermally treated in the presence of the wheat gluten glaze, however, the viscosity increase was slower than with no thermal inactivation but still occurred.

TABLE II

| Added Enzyme(s) | Time to Gel: 25° C. | Time to Gel: 5° C. |
|---|---|---|
| None | >2 mos., still liquid | >4 mo |
| 1 × (D) | >5 mo. | does not gel |
| 1.2 (C) | 10 days | not tested |
| 2.4 × (C & D) | 6 days | >21 days |
| 4.8 × (C & D) | 7 days | not tested |
| 17.2 × (C & D) | 5 days | not tested |
| 17.2 × (C & D)[1] | 7 days | not tested |
| 17.2 × (C & D)[2] | >15 days; STILL LIQUID | not tested |

C = Clarase (alpha amylase) and Diazyme (glucoamylase).
[1]Enzymes heated (95° C., 5 min.): AFTER addition to wheat gluten glaze
[2]Enzymes heated (95° C., 5 min.): BEFORE addition to wheat gluten glaze

Example 24

Minimizing Enzyme Concentration to Maximize the Stability of the Wheat Gluten Glaze In this scaled-up experiment, the level of both alpha amylase (Clarase) and glucoamylase were reduced to one tenth that used in Example 16. VWG powder (18.2 kg) was dispersed, using an impeller, into acidified water (1.28 kg glacial acetic acid, 7% based on VWG; 94.1 kg water). The slurry was heated to 55° C. and 15 ml of alpha amylase and 15 ml of glucoamylase were added and stirring continued for 3 hours. After 3 hours, the modified starch iodine test was negative. The suspension was heated to 90° C. for 30 minutes to insure maximal thermal inactivation of the enzymes. Sodium benzoate (57 grams) was added. The resultant product (approximately 15 gallons of 15.6% wheat gluten glaze) had a pH of 4.1.

On the hamburger buns this material gave exceptional gloss, dried quickly and gave clear films. This batch of wheat gluten glaze did not gel after 5 months at 5° C. and more than 2 months at 25° C.

Example 25

Minimizing the Concentration of Alpha-Amylase and Maximizing the Concentration of Wheat Gluten Glaze Solids The glucoamylase was not included initially in this trial and the level of alpha amylase (Clarase) was 50% less then that used in Example 24. In addition, the solids content was increased from 15% to 20% (i.e., 30% higher).

VWG powder (23.6 kg) was dispersed in acidified water (1.66 kg glacial acetic acid, 7% w/w of VWG; 94.1 kg water) with stirring until a uniform, though very viscous slurry was obtained. The temperature was raised to 55° C. and alpha amylase (Clarase, 7.5 ml) was added. Stirring was continued with aliquots checked for gloss on hamburger buns, viscosity, and starch iodine test every half hour. After 3 hours, the slurry was still very viscous, turbid on the bun, slow drying and positive for starch. An additional 7.5 ml of Clarase and 7.5 ml of glucoamylase were added. The total alpha amylase concentration was comparable to that in Examine 24 but lower than that in most of the previous examples. The glucoamylase concentration was still 50% lower than that in Example 24.

The wheat gluten glaze product gave good gloss on the hamburger buns and remained as stable as that described in Example 24.

Example 26

Spray-Drying the Wheat Gluten Glaze Suspension to Produce a Stable, readily Rehydratable Powder A 12% suspension of wheat gluten glaze produced according to the procedure described in Example 16, was sprayed in an APV spray drier (121° C. inlet, 71° C. outlet) to produce a powder which was whiter than the VWG starting material. When rehydrated in water, the powder tended to clump and was dispersed as a stable suspension only after 15 to 20 minutes to continuous stirring. The pH of the rehydrated powder was slightly higher than the starting suspension due to some loss of acetic acid during spray drying. Addition of dilute acetic acid until the pH was 3.9 to 4.1 was beneficial to stability. If the powder was dispersed in this dilute, supplemental acetic acid, it rehydrated more rapidly. The gloss, adhesion and other performance properties of the rehydrated wheat gluten glaze were comparable to the original suspension.

Higher solids wheat gluten glaze (i.e., 15% to 10%), made according to Examples 15, 24 and 25, were successfully spray dried using a slight modification of the above procedure: setting the outlet temperature on the APV drier to 88° C. to 96° C. (instead of 71° C.). This resulted in a fine white powder which was easier to disperse, particularly after addition of the acetic acid that was lost during the spray drying. That is, spray dried wheat gluten glaze powder (15 grams) was dispersed in acidified water (0.45 grams acetic acid; 3% based on powder) in 85 grams of distilled water with effective stirring. Complete dispersion required approximately 10 minutes but full rehydration required continued stirring for an additional 30 minutes to 1 hour.

Example 27

Use of the Gluten Glaze Suspension as an Edible Adhesive

A. Test Method #1

Gluten Glaze produced according to this invention was applied to each tared substrate followed by poppy seeds and allowed to dry. The weight of adhered poppy seeds was determined followed by using an air hose to dislodge the seeds from the substrate (hose held 4 inches from substrate). The percentage of seeds lost was determined and shown in the Table III below.

TABLE III

| Substrate | Test Adhesive | % of Poppy Seeds Retained |
|---|---|---|
| Filter paper | Gluten Glaze | 92% |
| | Water | 0% |
| Tortilla slice | Gluten Glaze | 81% |
| | Water | 0% |

B. Test Method #2

Gluten glaze-produced according to this invention and other test materials were sprayed on potato chips, allowed to dry (~50%) and sprinkled with a fine, red pepper seasoning. When fully dried, the chips were weighed and placed in clear polybags which were then placed on a shaker table. Medium agitation of the shaker table was continued over two days and the chips were periodically weighed to determine the loss of seasoning. The final results are shown below in Table IV.

TABLE IV

| Substrate | Test Adhesive | % of Poppy Seeds Retained |
|---|---|---|
| Potato chips | Gluten Glaze | 58% |
| | Maltodextrin | 28% |
| | Water | 30% |
| | Nothing | 21% |

C. Test Method #3

Gluten glaze produced according to this invention was applied to bagels and buns, allowed to partially dry, followed by addition of poppy seeds. After complete drying the now-glossy, seed-coated bagels were weighed and then frozen (−30° C.) and inspected for seed retention at various intervals. The results are shown below in Table V.

TABLE V

| Freeze-thaw Cycle | % Poppy Seed Retention | |
|---|---|---|
| | on bagel | on bun |
| Initial | 100% | 100% |
| one (15 min.) | 100% | 100% |
| two (15 min.) | 99% | 99% |
| three (15 min.) | 99% | 99% |
| four (15 min.) | 99% | 99% |

Equivalents

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A method for making an aqueous, colloidal dispersion of gluten microparticles, comprising the steps of:
    a) preparing an aqueous acid dispersion of gluten comprising an opaque, particulate starch under agitating conditions to yield a colloidal dispersion of gluten microparticles which is stable and homogeneous under storage conditions; and
    b) at least partially hydrolyzing opaque, particulate starch present in the gluten to yield a colloidal dispersion that can impart a glossy coating on a substrate.

2. The method of claim 1 wherein the gluten is from wheat, barley, rye, rice or sorghum.

3. The method of claim 1 wherein step (b) is performed by enzymatic hydrolysis.

4. The method claim 1 wherein the acid is selected from the group consisting of amino acids, alpha hydroxy acids, phosphoric acid, tricarboxylic acids and monocarboxylic acids.

5. The method of claim 1 further comprising adding a wax latex or emulsion to the colloidal dispersion.

6. The method of claim 1 further comprising incorporating an additive into the colloidal dispersion which is selected from the group consisting of plasticizers, coloring agents, flavoring agents, trace minerals, vitamins, nutrients, nutraceuticals and combinations thereof.

7. The method of claim 1 further comprising drying the colloidal dispersion to form a powder.

8. A colloidal dispersion comprising gluten microparticles produced by the method claim 7 which are rehydrated, wherein the microparticles are stably maintained in dispersion under storage conditions.

9. An aqueous colloidal dispersion produced by the method of claim 1.

10. The colloidal dispersion of claim 9 further comprising a wax and an additive selected from the group consisting of plasticizers, coloring agents, flavoring agents, trace minerals, vitamins, nutrients, nutraceuticals and combinations thereof.

11. A method for making an edible coating on a substrate, comprising the steps of:
   a) apply an aqueous colloidal dispersion of gluten microparticles produced by the method of claim 1 to a substrate; and
   b) drying the colloidal dispersion under ambient conditions to fuse and form an edible continuous coating of gluten microparticles onto the surface of said substrate.

12. The method of claim 11 wherein the substrate is selected from the group consisting of chocolates, high sugar confections, fruits, meats, baked goods, vegetables, seeds, nuts, beans, cereals, vitamins, tablets, cheese, fried foods, french fries and snack foods.

13. A substrate having an edible coating thereon, said coating comprising fused microparticles of gluten from an aqueous colloidal dispersion, produced by the method of claim 1, in which the liquid phase was removed at ambient or elevated temperature.

14. The coated substrate of claim 13 wherein the substrate is selected from the group consisting of chocolates, high sugar confections, fruits, meats, baked goods, vegetables, seeds, nuts, beans, cereal, vitamins, tablets, cheese, fried foods, french fries and snack foods.

15. A powder produced by drying a stable, homogenous, dilute aqueous acid colloidal dispersion of gluten microparticles produced by the method of claim 1.

16. An edible film derived from an aqueous colloidal dispersion produced by the method of claim 1.

17. A method for adhering edible particulate material onto the surface of a substrate, comprising the steps of:
   a) coating the substrate with an aqueous colloidal dispersion of gluten microparticles produced according to the method of claim 1; and
   b) applying an edible particulate material onto the coating before the coating completely dries.

18. The method of claim 17 wherein the edible particulate material is selected from the group consisting of fruit pieces, confections, candies, sprinkles, seeds, salt, spices and combinations thereof.

19. A method for making an aqueous, colloidal dispersion of gluten microparticles, comprising the steps of:
   a) preparing an aqueous acid dispersion of gluten comprising an opaque, particulate starch under agitating conditions to yield a colloidal dispersion of gluten microparticles which is stable and homogeneous under storage conditions;
   b) at least partially hydrolyzing opaque, particulate starch present in the gluten by treating the gluten with a starch hydrolyzing enzyme at a temperature suitable for enzyme activity, to yield a colloidal dispersion that can impart a glossy coating on a substrate; and
   c) deactivating the enzyme.

20. The method of claim 19 wherein the enzyme is an alpha amylase, glucoamylase and combination thereof.

21. The method of claim 19 further comprising the step of treating the gluten of step (a) with a debranching enzyme and/or pregelatinizing the gluten.

22. An aqueous colloidal dispersion produced by the method of claim 19.

23. A method for making an edible coating on a substrate, comprising the steps of:
   a) apply an aqueous colloidal dispersion of gluten microparticles produced by the method of claim 19 to a substrate; and
   b) drying the colloidal dispersion under ambient conditions to fuse and form an edible continuous coating of gluten microparticles onto the surface of said substrate.

24. The method of claim 23 wherein the substrate is selected from the group consisting of chocolates, high sugar confections, fruits, meats, baked goods, vegetables, seeds, nuts, beans, cereals, vitamins, tablets, cheese, fried foods, french fries and snack foods.

25. A substrate having an edible coating thereon, said coating comprising fused microparticles of gluten from an aqueous colloidal dispersion, produced by the method of claim 19, in which the liquid phase was removed at ambient or elevated temperature.

26. The coated substrate of claim 25 wherein the substrate is selected from the group consisting of chocolates, high sugar confections, fruits, meats, baked goods, vegetables, seeds, nuts, beans, cereal, vitamins, tablets, cheese, fried foods, french fries and snack foods.

27. A powder produced by drying a stable, homogenous, dilute aqueous acid colloidal dispersion of gluten microparticles produced by the method of claim 19.

28. An edible film derived from an aqueous colloidal dispersion produced by the method of claim 19.

29. A method for adhering edible particulate material onto the surface of a substrate, comprising the steps of:
   a) coating the substrate with an aqueous colloidal dispersion of gluten microparticles produced according to the method of claim 19; and
   b) applying an edible particulate material onto the coating before the coating completely dries.

30. The method of claim 29 wherein the edible particulate material is selected from the group consisting of fruit pieces, confections, candies, sprinkles, seeds, salt, spices and combinations thereof.

31. The method of claim 19 wherein the gluten is from wheat, barley, rye, rice or sorghum.

32. The method claim 19 wherein the acid is selected from the group consisting of amino acids, alpha hydroxy acids, phosphoric acid, tricarboxylic acids and monocarboxylic acids.

33. The method of claim 19 further comprising adding a wax latex or emulsion to the colloidal dispersion.

34. The method of claim 19 further comprising incorporating an additive into the colloidal dispersion which is selected from the group consisting of plasticizers, coloring agents, flavoring agents, trace minerals, vitamins, nutrients, nutraceuticals and combinations thereof.

35. The method of claim 19 further comprising drying the colloidal dispersion to form a powder.

* * * * *